(12) United States Patent
Vallespi-Gonzalez (10) Patent No.: US 10,489,686 B2
(45) Date of Patent: Nov. 26, 2019

(54) OBJECT DETECTION FOR AN AUTONOMOUS VEHICLE

(71) Applicant: UATC, LLC, San Francisco, CA (US)

(72) Inventor: Carlos Vallespi-Gonzalez, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 0 days.

(21) Appl. No.: 15/449,501

(22) Filed: Mar. 3, 2017

(65) Prior Publication Data

US 2017/0323179 A1    Nov. 9, 2017

Related U.S. Application Data

(63) Continuation of application No. 15/148,970, filed on May 6, 2016, now Pat. No. 9,672,446.

(51) Int. Cl.
*G06K 9/62* (2006.01)
*G06K 9/00* (2006.01)
*B60R 11/04* (2006.01)
*H04N 13/204* (2018.01)
*G05D 1/00* (2006.01)
(Continued)

(52) U.S. Cl.
CPC ............ *G06K 9/6267* (2013.01); *B60R 11/04* (2013.01); *G05D 1/0088* (2013.01); *G05D 1/0251* (2013.01); *G06K 9/00805* (2013.01); *G06K 9/6202* (2013.01); *H04N 13/204* (2018.05);
(Continued)

(58) Field of Classification Search
CPC ............ G06K 9/6267; G06K 9/00201; G06K 9/00805; G06K 9/6202; B60R 11/04; G05D 1/0088; G05D 1/0251; H04N 13/0203; H04N 13/0239
See application file for complete search history.

(56) References Cited

U.S. PATENT DOCUMENTS 5,751,852 A * 5/1998 Marimont ............ G06K 9/4638
382/180
5,809,179 A * 9/1998 Marimont ................ G06T 7/12
382/173
(Continued)

FOREIGN PATENT DOCUMENTS

CN    102390370    3/2012
CN    202394343 U  8/2012
(Continued)

OTHER PUBLICATIONS

International Search Report and Written Opinion issued in PCT/US2016/066235 dated Mar. 27, 2017.
(Continued)

*Primary Examiner* — Behrang Badii
*Assistant Examiner* — Daniel L Greene
(74) *Attorney, Agent, or Firm* — Dority & Manning, P.A.

(57) ABSTRACT

An object detection system for an autonomous vehicle processes sensor data, including one or more images, obtained for a road segment on which the autonomous vehicle is being driven. The object detection system compares the images to three-dimensional (3D) environment data for the road segment to determine pixels in the images that correspond to objects not previously identified in the 3D environment data. The object detection system then analyzes the pixels to classify the objects not previously identified in the 3D environment data.

20 Claims, 5 Drawing Sheets

(51) Int. Cl.
*G05D 1/02* (2006.01)
*H04N 13/239* (2018.01)
*H04N 13/00* (2018.01)

(52) U.S. Cl.
CPC ....... *H04N 13/239* (2018.05); *G06K 9/00201* (2013.01); *H04N 2013/0081* (2013.01)

(56) References Cited

U.S. PATENT DOCUMENTS

| | | | |
|---|---|---|---|
| 5,864,214 | A | 1/1999 | Brodsky |
| 6,542,111 | B1 | 4/2003 | Wilson |
| 6,795,031 | B1 | 9/2004 | Walker |
| 7,102,496 | B1 | 9/2006 | Ernst, Jr. |
| 7,124,027 | B1 | 10/2006 | Ernst, Jr. |
| 7,783,403 | B2 | 8/2010 | Breed |
| 7,994,465 | B1 | 8/2011 | Bamji |
| 8,145,402 | B2 | 3/2012 | Craig |
| 8,224,516 | B2 * | 7/2012 | Anderson ............ G05D 1/0219 701/23 |
| 8,245,516 | B2 | 8/2012 | Anderson |
| 8,253,799 | B2 | 8/2012 | Elangovan |
| 8,559,673 | B2 | 10/2013 | Fairfield |
| 9,045,041 | B2 | 6/2015 | Dorum |
| 9,097,800 | B1 | 8/2015 | Zhu |
| 9,145,140 | B2 | 9/2015 | Ferguson |
| 9,158,980 | B1 | 10/2015 | Ferguson |
| 9,223,013 | B2 | 12/2015 | Stein |
| 9,330,321 | B2 | 5/2016 | Schamp |
| 9,383,753 | B1 | 7/2016 | Templeton |
| 9,386,230 | B1 | 7/2016 | Duran |
| 9,442,487 | B1 | 9/2016 | Ferguson |
| 9,507,346 | B1 * | 11/2016 | Levinson ............ G05D 1/0214 |
| 9,672,446 | B1 | 6/2017 | Vallespi-Gonzalez |
| 9,719,801 | B1 | 8/2017 | Ferguson et al. |
| 9,840,256 | B1 | 12/2017 | Valois |
| 9,841,763 | B1 | 12/2017 | Valois |
| 9,863,928 | B1 | 1/2018 | Peterson |
| 9,916,703 | B2 | 3/2018 | Levinson |
| 2002/0161501 | A1 | 10/2002 | Dulin |
| 2003/0001509 | A1 | 1/2003 | Leleve |
| 2003/0040944 | A1 | 2/2003 | Hileman |
| 2004/0133330 | A1 | 7/2004 | Ono |
| 2004/0204812 | A1 | 10/2004 | Tran |
| 2005/0010350 | A1 | 1/2005 | Hiwatashi |
| 2005/0100207 | A1 * | 5/2005 | Konolige ................ G06T 7/20 382/154 |
| 2005/0113999 | A1 | 5/2005 | Tange |
| 2005/0222744 | A1 | 10/2005 | Sakata |
| 2006/0002586 | A1 | 1/2006 | Aggarwal |
| 2006/0128087 | A1 | 6/2006 | Bamji |
| 2006/0208911 | A1 | 9/2006 | Davis |
| 2006/0223637 | A1 | 10/2006 | Rosenberg |
| 2006/0259225 | A1 | 11/2006 | Ono |
| 2007/0050121 | A1 | 3/2007 | Ammon |
| 2007/0268364 | A1 | 11/2007 | Neff |
| 2008/0040004 | A1 | 2/2008 | Breed |
| 2008/0129475 | A1 | 6/2008 | Breed |
| 2008/0162036 | A1 | 7/2008 | Breed |
| 2009/0010495 | A1 | 1/2009 | Schamp |
| 2009/0043440 | A1 * | 2/2009 | Matsukawa .......... G05D 1/0214 701/25 |
| 2009/0146813 | A1 | 6/2009 | Nuno |
| 2009/0216600 | A1 | 8/2009 | Hill |
| 2009/0306859 | A1 | 12/2009 | Tichy |
| 2009/0319129 | A1 | 12/2009 | Ghoneim |
| 2009/0322872 | A1 * | 12/2009 | Muehlmann ............ G01S 11/12 348/142 |
| 2010/0013615 | A1 * | 1/2010 | Hebert .................. B60Q 9/006 340/425.5 |
| 2010/0020170 | A1 | 1/2010 | Higgins-Luthman |
| 2010/0023213 | A1 | 1/2010 | Mizuno |
| 2010/0023214 | A1 | 1/2010 | Horiguchi |
| 2010/0165323 | A1 | 7/2010 | Fiess |
| 2010/0217491 | A1 | 8/2010 | Naito |
| 2010/0250052 | A1 | 9/2010 | Ogino |
| 2010/0250056 | A1 | 9/2010 | Perkins |
| 2010/0262359 | A1 | 10/2010 | Motoyama |
| 2010/0280751 | A1 | 11/2010 | Breed |
| 2010/0295946 | A1 | 11/2010 | Reed |
| 2011/0043377 | A1 | 2/2011 | McGrath |
| 2011/0060478 | A1 | 3/2011 | Nickolaou |
| 2011/0285982 | A1 | 11/2011 | Breed |
| 2012/0006610 | A1 | 1/2012 | Wallace |
| 2012/0045090 | A1 | 2/2012 | Bobbitt |
| 2012/0158313 | A1 | 6/2012 | Wang |
| 2012/0242492 | A1 | 9/2012 | Grunfeld |
| 2012/0283912 | A1 | 11/2012 | Lee |
| 2012/0327410 | A1 | 12/2012 | Maston |
| 2013/0015984 | A1 | 1/2013 | Yamashiro |
| 2013/0018575 | A1 | 1/2013 | Birken |
| 2013/0060461 | A1 | 3/2013 | Wong |
| 2013/0083159 | A1 * | 4/2013 | Ooshima ................ G03B 35/02 348/36 |
| 2013/0215115 | A1 * | 8/2013 | Jenkins ................... G06T 15/20 345/420 |
| 2013/0314503 | A1 | 11/2013 | Nix |
| 2013/0325279 | A1 | 12/2013 | Fujimoto |
| 2014/0002277 | A1 | 1/2014 | Fulger |
| 2014/0025232 | A1 | 1/2014 | Cuddihy |
| 2014/0046585 | A1 | 2/2014 | Morris |
| 2014/0136414 | A1 * | 5/2014 | Abhyanker ............ G06Q 50/28 705/44 |
| 2014/0188363 | A1 | 7/2014 | Eckert |
| 2014/0222298 | A1 | 8/2014 | Gurin |
| 2014/0247357 | A1 | 9/2014 | Sekiguchi |
| 2014/0302774 | A1 | 10/2014 | Burke |
| 2014/0306835 | A1 | 10/2014 | Ricci |
| 2014/0336842 | A1 | 11/2014 | Jang |
| 2014/0336935 | A1 | 11/2014 | Zhu |
| 2015/0003670 | A1 | 1/2015 | Kuehnle |
| 2015/0035985 | A1 | 2/2015 | Conneely |
| 2015/0061856 | A1 | 3/2015 | Raman |
| 2015/0112585 | A1 | 4/2015 | Knepper |
| 2015/0166072 | A1 | 6/2015 | Powers |
| 2015/0202770 | A1 * | 7/2015 | Patron .................... G05D 1/024 700/245 |
| 2015/0203107 | A1 | 7/2015 | Lippman |
| 2015/0210274 | A1 | 7/2015 | Clarke |
| 2015/0210277 | A1 | 7/2015 | Ben Shalom |
| 2015/0224845 | A1 * | 8/2015 | Anderson ............ B60G 17/019 701/37 |
| 2015/0247733 | A1 | 9/2015 | Horihata |
| 2015/0251659 | A1 | 9/2015 | Fischer |
| 2015/0266471 | A1 | 9/2015 | Ferguson |
| 2015/0331422 | A1 | 11/2015 | Hartung |
| 2015/0344038 | A1 | 12/2015 | Stenneth |
| 2015/0356357 | A1 * | 12/2015 | McManus .......... G06K 9/00791 382/104 |
| 2016/0133131 | A1 | 5/2016 | Grimm |
| 2016/0167582 | A1 | 6/2016 | Chen |
| 2016/0176408 | A1 | 6/2016 | Lynch |
| 2016/0178802 | A1 | 6/2016 | Stainvas Olshansky |
| 2016/0180171 | A1 | 6/2016 | Kamata |
| 2016/0207537 | A1 * | 7/2016 | Urano .................. B60W 30/182 |
| 2016/0267720 | A1 * | 9/2016 | Mandella ............. G06T 19/006 |
| 2016/0357188 | A1 * | 12/2016 | Ansari ................ G05D 1/0212 |
| 2016/0368504 | A1 | 12/2016 | Kieren |
| 2017/0059336 | A1 | 3/2017 | Huang |
| 2017/0090478 | A1 | 3/2017 | Blayvas |
| 2017/0126975 | A1 | 5/2017 | Duran |
| 2017/0174194 | A1 | 6/2017 | Baumgaertner |
| 2017/0248963 | A1 * | 8/2017 | Levinson ............... G01C 21/32 |
| 2017/0313324 | A1 | 11/2017 | Kumai |
| 2017/0316333 | A1 | 11/2017 | Levinson |
| 2017/0351261 | A1 | 12/2017 | Levinson |
| 2017/0358204 | A1 | 12/2017 | Modica |

(56) References Cited

U.S. PATENT DOCUMENTS

2018/0164119 A1    6/2018  Becker
2018/0189578 A1*  7/2018  Yang .................. G01C 21/3635

FOREIGN PATENT DOCUMENTS

| | | |
|---|---|---|
| CN | 103370249 | 10/2013 |
| CN | 104601648 A | 5/2015 |
| JP | 2005-115911 | 4/2005 |
| JP | 2006-159939 | 6/2006 |
| JP | 2008-027239 | 2/2008 |
| JP | 2008-262459 | 10/2008 |
| JP | 2009-075756 | 4/2009 |
| JP | 2015-007874 | 1/2015 |
| KR | 100862561 | 10/2008 |
| WO | WO 2013155661 A1 | 10/2013 |
| WO | WO 2014072972 | 5/2014 |
| WO | WO 2014108267 | 7/2014 |
| WO | WO 2014131400 | 9/2014 |

OTHER PUBLICATIONS

Azim Asma, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Andres Serna et al.: "Detection, segmentation and classification of 3D urban objects using mathematical morphology and supervised learning", ISPRS Journal of Photogrammetry and Remote Sensing, vol. 93, Jul. 1, 2014, pp. 243-255, Amsterdam, NL.

EESR issued in EP 17169669.3 dated Sep. 13, 2017.

International Search Report and Written Opinion issued in PCT/US2016/031929 dated Aug. 17, 2016.

Office Action issued in EP 17169669.3 dated Jun. 18, 2018.

Hrabar, "3D path planning and stereo-based obstacle avoidance for rotorcraft UAVs", Intelligent Robots and Systems, 2008, IROS 2008. IEEE/RSJ International Conference on, 9/22/200.

Hrabar, "An evaluation of stereo and laser-based range sensing for rotorcraft unmanned aerial vehicle obstacle avoidance", Journal of Field Rebotics, vol. 29, No. 2, Oct. 18, 2011.

Ros, et al., "Vision-Based Offline-Online Perception Paradigm for Autonomous Driving", 2015 IEEE Winter Conference on Applications of Computer Vision, IEEE, Jan. 5, 2015.

IPRP issued in PCT/US2016/066235 dated Jun. 21, 2018.

Gilbert Held, Inter- and Intra—Vehicle Communications 1st Edition, Nov. 8, 2007, Auerbach ublications, XP055503113, ISBN: 978-1-4200-5221-3, pp. ToC, Ch01, 41-50, Ch03, 93-100, Ind, 1 page.

Jack Erjavec, Automotive Technology: A Systems Approach, Feb. 21, 2014, Delmar Cengage Learning, XP055506654, ISBN: 978-1-133-61231-5, pp. ToC, 616-620, 647-651, 664-668, 24 pages.

Hermann Winner, Handbuch Fahrerassistenzsystem: Grundlagen, Komponenten und Systeme fur aktive Sicherheit und Komfort, Apr. 20, 2015, Springer XP055506347, ISBN: 978-3-658-05733-6, pp. ToC, Ch14, Ch26-Ch29, Ch38, Ch55, Ind, 132 pages.

EESR issued in EP 16793475.1 dated Sep. 21, 2018, 14 Pages.

Office Action issued in CN 201710311393.1 dated Nov. 12, 2018, 20 pages.

Office Action issued in CN 201680040538.2 dated Sep. 10, 2018, 11 Pages.

Office Action issued in CN 201710311393.1 dated Nov. 12, 2018.

* cited by examiner

OBJECT DETECTION FOR AN AUTONOMOUS VEHICLE

CROSS-REFERENCE TO RELATED APPLICATIONS

This application is a continuation of U.S. patent application Ser. No. 15/148,970 filed May 6, 2016, titled "OBJECT DETECTION FOR AN AUTONOMOUS VEHICLE", the foregoing application hereby incorporated by reference herein for all purposes.

BACKGROUND

Autonomous vehicles (AVs) require continuous sensor data processing in order to operate through road traffic on public roads in order to match or even surpass human capabilities. AVs can be equipped with many kinds of sensors, including stereoscopic cameras and optical flow sensors, but processing images from a stereoscopic camera in real-time with enough fidelity to properly identify and classify obstacles is a challenge. Moreover, adding additional sensors requires more processing power and generates redundant and extraneous data.

In stereo vision, images are captured from a pair of cameras or lenses of a camera that are slightly displaced relative to each other. This positional difference is known as horizontal disparity and allows a stereo camera to perceive and calculate depth, or the distance from the camera to objects in a scene. At present, stereoscopic imaging is mostly fulfilled by utilizing a parallax effect. By providing a left image for a left eye and a right image for a right eye, it is possible to convey a 3D impression to a viewer when the viewer is watching the images at an appropriate viewing angle. A two-view stereoscopic video is a video generated by utilizing such an effect and each frame of the video includes an image for a left eye and another image for a right eye. The depth information of objects in the frame can be obtained by processing the two-view stereoscopic video. The depth information for all pixels of the image makes up a disparity map.

Optical flow is the pattern of apparent motion of objects, surfaces, and edges in a visual scene caused by the relative motion between an observer (an eye or a camera) and the scene. The optical flow methods try to calculate the motion, for each pixel or voxel position, between two image frames which are taken at separate times. An optical flow sensor is a vision sensor capable of measuring optical flow or visual motion and outputting a measurement based on optical flow.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

An object detection and classification system is disclosed that enables an autonomous vehicle (AV) to efficiently identify and classify objects that may prove hazardous to the AV. In order to detect and classify objects in the environment around a vehicle, sensors equipped on the vehicle can continually acquire data for the environment and process the sensor data into one or more images or other convenient formats for analyzing and comparing the data. For example, a disparity mapper can process pairs of images from a stereo camera into a disparity image or map, and an optical flow unit can process consecutive images from a camera or other optical flow sensor into an image that shows motion vectors of pixels in the images over time.

In one example, rather than analyzing the entirety of each channel of sensor data, which can be prohibitively time-consuming and require a significant amount of processing power, a joint classifier can optimally focus solely on interesting or unexpected aspects discovered in the sensor data. In some implementations, the classifier can compare image maps from the processed sensor data to sub-maps of 3D environment data. For example, disparity data taken from stereo camera images can form a disparity map showing distances from the vehicle to objects in the environment. Assuming that no new features or objects are present in the scene that are not included in the 3D environment data, the disparity map data should be roughly equal (within a reasonable margin of error to account for map inaccuracies) to distances from the vehicle to known objects in the 3D environment data. In another example, optical flow vectors calculated between consecutive images of the scene should match the known objects (i.e., stationary objects should show no movement in a non-moving reference frame).

Any discrepancies between image maps created from the real-time sensor data and the previously recorded sub-map environment data potentially identify areas with unknown features/objects or changes since the environment data was last updated. Therefore, the classifier can determine sets of pixels in the image maps that correspond to these unknown objects in order to reduce the amount of further data processing performed on the sensor data to classify objects that may be a hazard to a vehicle. For each of the sets of pixels identified, the classifier can analyze images and parts of other sensor data corresponding to the identified pixels to discover objects not represented in the 3D environment data. For each of the discovered objects, the classifier can classify the object into a category such as other vehicles, bicyclists, or pedestrians. Furthermore, the classifier can identify contextual information about each object, for example, the speed and pose of the object, direction of movement, presence of other dynamic objects, and other information.

In some examples, an object detection system for an autonomous vehicle processes sensor data, including one or more images, obtained for a road segment on which the autonomous vehicle is being driven. The object detection system compares the images to three-dimensional (3D) environment data for the road segment to determine pixels in the images that correspond to objects not previously identified in the 3D environment data. The object detection system then analyzes the pixels to classify the objects not previously identified in the 3D environment data.

According to some aspects, the object detection system identifies a subset of sensor data from non-image sources corresponding to the pixels which were determined from the images to correspond to objects not previously identified in the 3D environment data. The object detection system can then classify the objects based on analyzing the subset of sensor data and also adjust operation of the autonomous vehicle based at least on the classification of the objects.

In some aspects, the one or more images include disparity data calculated from a pair of images taken from a stereoscopic camera. In other aspects, the images include optical flow vectors calculated from a first image of the road segment and a second image of the road segment taken after the first image. Furthermore, the objects are classified into classes which include pedestrians, bicycles, and other vehicles.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs drive without any human assistance from within or external to the vehicle. Such vehicles often are required to make advance determinations regarding how the vehicle is behave given challenging surroundings of the vehicle environment.

System Description

Figure 1:
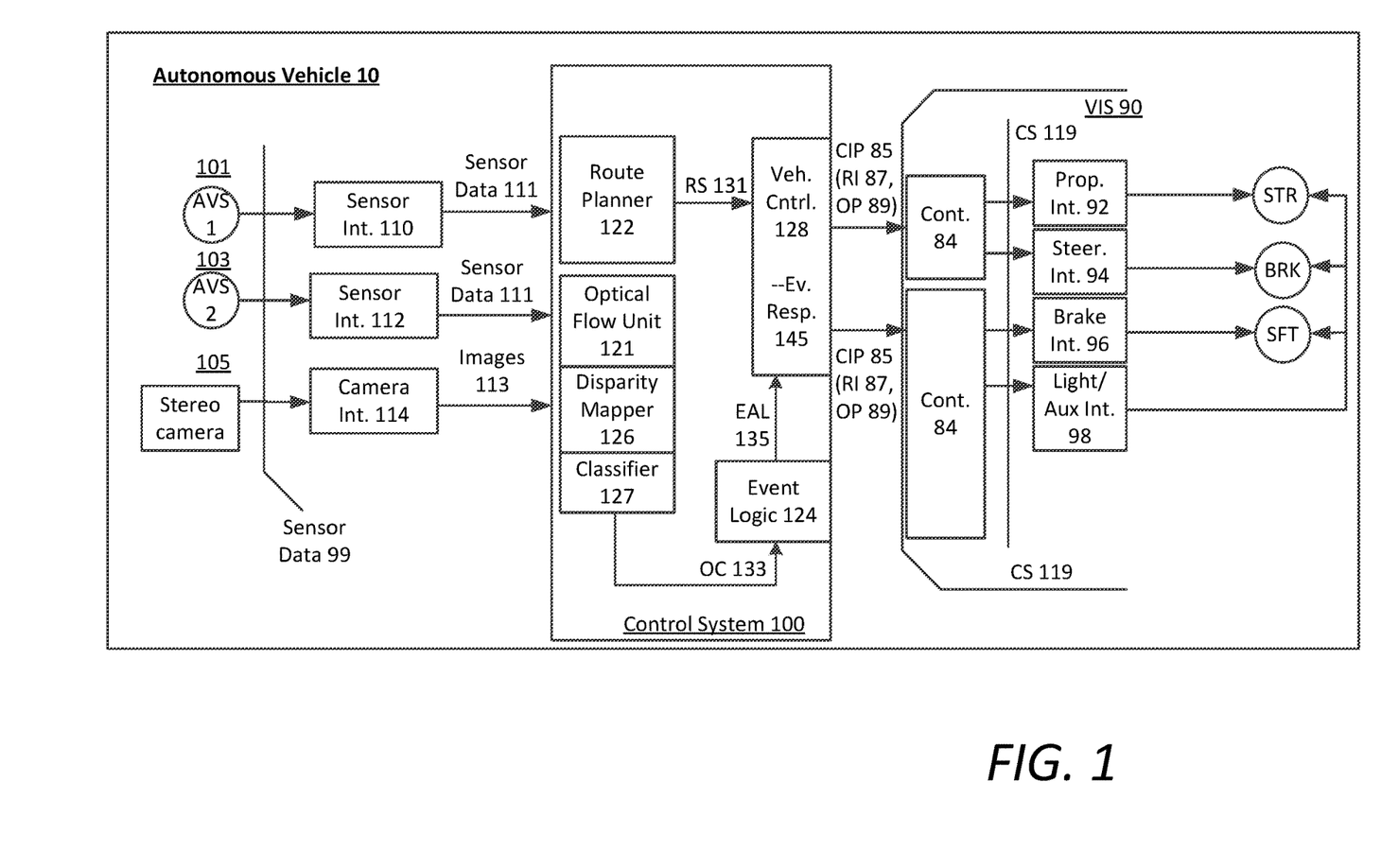
FIG. 1 illustrates an example control system for operating an autonomous vehicle including, as described herein.

FIG. 1 illustrates an example control system for operating an autonomous vehicle including, as described herein. In an example of FIG. 1, a control system 100 can be used to autonomously operate an AV 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes a computer or processing system which operates to process sensor data 99 that is obtained on the vehicle with respect to a road segment upon which the vehicle 10 operates. The sensor data 99 can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

The AV 10 can be equipped with multiple types of sensors 101 and 103, which combine to provide a computerized perception of the space and environment surrounding the vehicle 10. Likewise, the control system 100 can operate within the AV 10 to receive sensor data 99 from the collection of sensors 101 and 103, and to control various electromechanical interfaces for operating the vehicle on roadways.

In more detail, the sensors 101 and 103 operate to collectively obtain a complete sensor view of the vehicle 10, and further to obtain situational information proximate to the vehicle 10, including any potential hazards in a forward operational direction of the vehicle 10. By way of example, the sensors can include proximity or touch sensors, remote detection sensors such as provided by radar or LIDAR, a stereo camera 105 (stereoscopic pairs of cameras or depth perception cameras), and/or sonar sensors.

Each of the sensors 101 and 103 and stereo camera 105 can communicate with the control system 100 utilizing a corresponding sensor interface 110, 112 or camera interface 114. Each of the interfaces 110, 112, 114 can include, for example, hardware and/or other logical components which are coupled or otherwise provided with the respective sensor. For example, camera interface 114 can connect to a video camera and/or stereoscopic camera 105 which continually generates image data of an environment of the vehicle 10. The stereo camera 105 can include a pair of imagers, each of which is mounted to a rigid housing structure that maintains the alignment of the imagers on a common plane when the vehicle is in motion. As an addition or alternative, the interfaces 110, 112, 114 can include a dedicated processing resource, such as provided with a field programmable gate array ("FPGA") which can, for example, receive and/or process raw image data from the camera sensor.

In some examples, the interfaces 110, 112, 114 can include logic, such as provided with hardware and/or programming, to process sensor data 99 from a respective sensor 101 or 103. The processed sensor data 99 can be outputted as sensor data 111. Camera interface 114 can process raw image data from stereo camera 105 into images 113 for the control system 100. As an addition or variation, the control system 100 can also include logic for processing raw or pre-processed sensor data 99 and images 113.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the AV 10 follows a current route. Thus, while the vehicle 10 is actively driven along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the AV 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include a route planner 122, optical flow unit 121, disparity mapper 126, classifier 127, event logic 124, and a vehicle control 128. The vehicle control 128 represents logic that converts alerts of event logic 124 ("event alert 135") into commands 85 that specify a set of vehicle actions.

Additionally, the route planner 122 can select one or more route segments that collectively form a path of travel for the AV 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

According to examples described herein, the control system 100 includes an optical flow unit 121 and disparity mapper 126 to monitor the situational environment of the AV 10 continuously in order to dynamically calculate disparity maps and optical flow images as the AV 10 travels along a current route. The external entity can be a pedestrian or group of pedestrians, a human-driven vehicle, a bicyclist, and the like.

The sensor data 111 captured by the sensors 101 and 103 and images 113 from the camera interface 114 can be processed by an on-board optical flow unit 121 and disparity mapper 126. Optical flow unit 121 and disparity mapper 126 can utilize mapping resource data and previously recorded sub-maps that contain surface data for a given region. Disparity mapper 126 can compare this sub-map data with the images 113 taken from stereo camera 105 in order to improve disparity map calculations, both in terms of accuracy and speed. Classifier 127 can then use these maps and optical flow images to create object classifications 133 to assist the AV 10 in maneuvering through road traffic to a particular destination. For example, the disparity mapper 126 can utilize a current sub-map that includes recorded 3D LIDAR data and 3D stereo data of the current route traveled by the AV 10. The disparity mapper 126 can continuously compare the sensor data 111 to the 3D LIDAR data and stereo data of the current sub-map to help classifier 127 identify potential hazards, such as pedestrians, other vehicles, bicyclists, etc. Accordingly, classifier 127 can generate object classifications 133 for event logic 124.

With respect to detected objects, in some implementations, the classifier 127 detects and classifies objects which are on or near the roadway and which can potentially ingress into the path of travel so as to interfere or collide with the autonomous vehicle 10. The detected objects can be off of the road (e.g., on sidewalk, etc.) or on the road (e.g., on shoulder or on opposite lane of road). In addition to detecting and classifying the object, the classifier 127 can utilize contextual information for the object and its surroundings to predict a probability that the object will interfere or collide with vehicle 10. The contextual information can include determining the object position relative to the path of the vehicle 10 and/or pose relative to a point of ingress with the path of the autonomous vehicle 10. As an addition or alternative, the contextual information can also identify one or more characteristics of the object's motion, such as a direction of movement, a velocity or acceleration.

In certain implementations, the event logic 124 can refer to the object classifications 133 in determining whether to trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environment conditions on the road segment. The event logic 124 can use sensor data 111 and images 113 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. Additionally, the control system 100 can determine whether an event corresponds to a potential incident with a human driven vehicle, a pedestrian, or other human entity external to the AV 10. An event can be scored or classified between a range of likely harmless (e.g., small debris in roadway) to very harmful (e.g., vehicle crash may be imminent) from the sensor data 111 and object classifications 133. In turn, the vehicle control 128 can determine a response based on the score or classification. Such response can correspond to an event avoidance action 145, or an action that the vehicle 10 can perform to maneuver the vehicle 10 based on the detected event and its score or classification. By way of example, the vehicle response can include a slight or sharp vehicle maneuvering for avoidance using a steering control mechanism and/or braking component. The event avoidance action 145 can be signaled through the commands 85 for controllers 84 of the vehicle interface subsystem 90.

When an anticipated dynamic object with a particular classification moves into a position of likely collision or interference, some examples provide that event logic 124 can signal an event alert 135 to cause the vehicle control 128 to generate commands 85 that correspond to an event avoidance action 145. For example, in the event of a bicycle crash in which the bicycle (or bicyclist) falls into the path of the vehicle 10, event logic 124 can signal an event alert 135 to avoid the collision. The event alert 135 can indicate (i) a classification of the event (e.g., "serious" and/or "immediate"), (ii) information about the event, such as the type of object that generated the event alert 135, and/or information indicating a type of action the vehicle 10 should take (e.g., location of object relative to path of vehicle, size or type of object, etc.).

Figure 2:
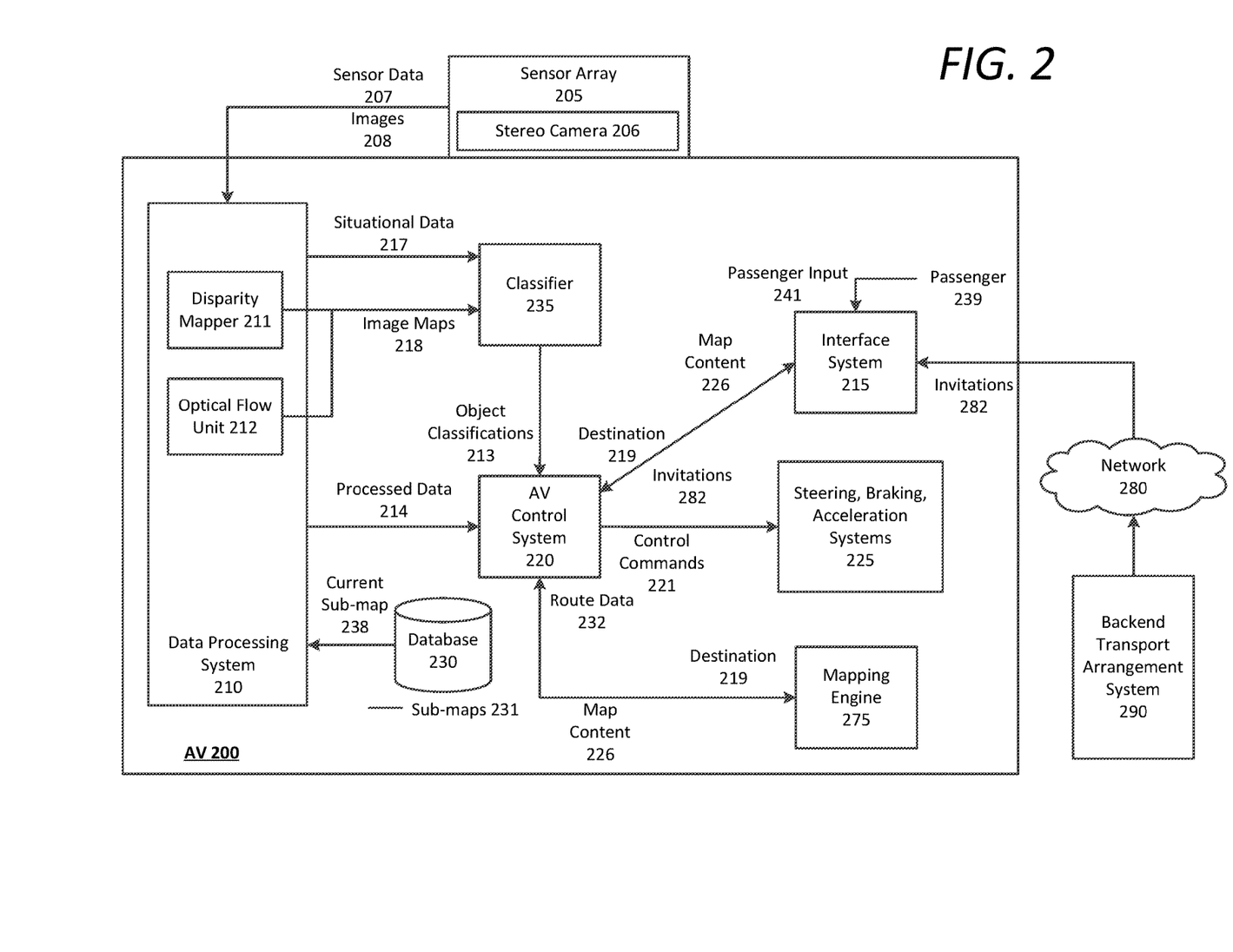
FIG. 2 illustrates an example autonomous vehicle including a disparity mapping and object classification system, in accordance with one or more embodiments.

FIG. 2 illustrates an example autonomous vehicle including a disparity mapping and object classification system, in accordance with one or more embodiments. The AV 200 shown in FIG. 2 can include some or all aspects and functionality of the autonomous vehicle 10 described with respect to FIG. 1. Referring to FIG. 2, the AV 200 can include a sensor array 205 that can provide sensor data 207 to an on-board data processing system 210. As described herein, the sensor array 205 can include any number of active or passive sensors that continuously detect a situational environment of the AV 200. For example, the sensor array 205 can include a number of camera sensors (e.g., stereo camera 206), LIDAR sensor(s), proximity sensors, radar, and the like. The data processing system 210 can utilize the sensor data 207 and images 208 to detect the situational conditions of the AV 200 as the AV 200 travels along a current route. For example, the data processing system 210 can identify potential obstacles or road hazards, such as pedestrians, bicyclists, objects on the road, road cones, road signs, animals, etc., which classifier 235 can classify in order to enable an AV control system 220 to react accordingly.

The AV 200 can further include a database 230 that includes sub-maps 231 for the given region in which the AV 200 operates. The sub-maps 231 can comprise detailed road data previously recorded by a recording vehicle using sensor equipment, such as LIDAR, stereo camera, and/or radar equipment. In some aspects, several or all AVs in the fleet can include this sensor equipment to record updated sub-maps 231 along traveled routes and submit the updated sub-maps 231 to the backend system 290, which can transmit the updated sub-maps 231 to the other AVs in the fleet for storage. Accordingly, the sub-maps 231 can comprise ground-based, three-dimensional (3D) environment data along various routes throughout the given region (e.g., a city).

In many aspects, the on-board data processing system 210 can provide continuous processed data 214 to the AV control system 220 to respond to point-to-point activity in the AV's 200 surroundings. The processed data 214 can comprise comparisons between the actual sensor data 207—which represents an operational environment of the AV 200, and which is continuously collected by the sensor array 205—and the stored sub-maps 231 (e.g., LIDAR-based sub-maps). In certain examples, the data processing system 210 is programmed with machine learning capabilities to enable the AV 200 to identify and respond to conditions, events, or potential hazards. In variations, the on-board data processing system 210 can continuously compare sensor data 207 to stored sub-maps 231 in order to perform a localization to continuously determine a location and orientation of the AV 200 within the given region. Localization of the AV 200 is necessary in order to make the AV 200 self-aware of its instant location and orientation in comparison to the stored sub-maps 231 in order to maneuver the AV 200 on surface streets through traffic and identify and respond to potential hazards, such as pedestrians, or local conditions, such as weather or traffic.

The data processing system 210 can compare the sensor data 207 from the sensor array 205 with a current sub-map 238 from the sub-maps 231 to identify obstacles and potential road hazards in real time. In some aspects, a disparity mapper 211 and optical flow unit 212, which can be part of the data processing system 210, process the sensor data 207, images 208 from the stereo camera 206, and the current sub-map 238 to create image maps 218 (e.g., disparity maps and optical flow images). Classifier 235 can then provide object classifications 213—identifying obstacles and road hazards—to the AV control system 220, which can react accordingly by operating the steering, braking, and acceleration systems 225 of the AV 200 to perform low level maneuvering.

The images 208 and/or sensor data 207 can be subjected to processes for creating image maps 218, situational data 217, and processed data 214. Disparity mapper 211 and optical flow unit 212 process the images 208 to detect and extract image data that can be compared to sub-map data in order to perform techniques such as background subtraction in pixel space to more efficiently identify and extract objects that may pose a hazard to AV 200. The classifier 235 can determine whether any extracted candidate object is an object of a predetermined class. For example, the classifier 235 can include models that are trained to determine objects that are pedestrians, bicyclists, or other vehicles. According to some examples, the classifier 235 can compare image maps 218 and situational data 217, which may include various aspects of sensor data 207, images 208, and data from the current sub-map 238, in order to identify visual indicators of the detected object which are indicative of the object's subsequent movement.

The disparity mapper 211 can output a generated disparity map (as image maps 218) for classifier 235 to use in classifying objects in the scene. In some aspects, an optical flow unit 212 can use the apparent motion of features in the field of view of the moving stereo camera 206 to supplement or replace the baseline disparity image generated from the 3D environment data. From either of the lenses of the stereo camera 206, a map of optical flow vectors can be calculated between a previous frame and a current frame. The optical flow unit 212 can use these vectors to improve the correspondence search algorithm. For example, given the motion vector of a pixel in the left image from the stereo camera 206, the motion vector of a corresponding pixel in the right image should be similar after accounting for the different perspective of the right lens of the stereo camera 206. Furthermore, image maps 218 can include images of optical flow vectors that classifier 235 can use to improve object classifications 213.

According to some examples, the data processing system 210 can perform image recognition and/or analysis in order to (i) detect objects which are moving or can move and which are in the field of view of the sensors for the autonomous vehicle 10, and (ii) determine contextual object information for the detected objects. The data processing system 210 can analyze the images 208 and/or sensor data 207 in order to detect shapes that are not known to be static objects in the current sub-map 238. To improve this process, disparity mapper 211 and optical flow unit 212 can produce image maps 218 that can be combined with other channels of sensor data 207 (such as LIDAR, radar, or sonar data) in order to match features in the image data to features known from the current sub-map 238. This matching can be performed in image or pixel space. Utilizing background subtraction based on the 3D environment data from the current sub-map 238, classifier 235 can reduce the image maps 218 and other images 208 from the sensor array 205 to areas, or sets of pixels, that contain unexpected differences from the 3D environment data.

In accordance with aspects disclosed, the classifier 235 can also monitor situational data 217 from the data processing system 210 to identify potential areas of conflict. For example, the classifier 235 can monitor forward directional stereoscopic camera data or LIDAR data to identify areas of concern. In one example, the classifier 235 can utilize the current sub-map 238 to identify features along the current route traveled (e.g., as indicated by the route data 232), such as traffic signals, intersections, road signs, crosswalks, bicycle lanes, parking areas, and the like. As the AV 200 approaches such features or areas, the classifier 235 can monitor the forward situational data 217 to identify any external entities that may conflict with the operational flow of the AV 200, such as pedestrians near a crosswalk or another vehicle approaching an intersection.

In many examples, while the AV control system 220 operates the steering, braking, and acceleration systems 225 along the current route on a high level, object classifications 213 provided to the AV control system 220 can indicate low level occurrences, such as obstacles and potential hazards, to which the AV control system 220 can make decisions and react. For example, object classifications 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to different types of objects by generating control commands 221 to reactively operate the steering, braking, and acceleration systems 225 accordingly.

In many implementations, the AV control system 220 can receive a destination 219 from, for example, an interface system 215 of the AV 200. The interface system 215 can include any number of touch-screens, voice sensors, mapping resources, etc., that enable a passenger 239 to provide a passenger input 241 indicating the destination 219. For example, the passenger 239 can type the destination 219 into a mapping engine 275 of the AV 200, or can speak the destination 219 into the interface system 215. Additionally or alternatively, the interface system 215 can include a wireless communication module that can connect the AV 200 to a network 280 to communicate with a backend transport arrangement system 290 to receive invitations 282 to service a pick-up or drop-off request. Such invitations 282 can include the destination 219 (e.g., a pick-up location), and can be received by the AV 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate passenger pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the AV 200 to the destination 219 along the selected route. For example, the AV control system 220 can dynamically generate control commands 221 for the autonomous vehicle's steering, braking, and acceleration system 225 to actively drive the AV 200 to the destination 219 along the selected route. Optionally, the map content 226 showing the current route traveled can be streamed to the interior interface system 215 so that the passenger(s) 239 can view the route and route progress in real time.

Methodology

Figure 3:
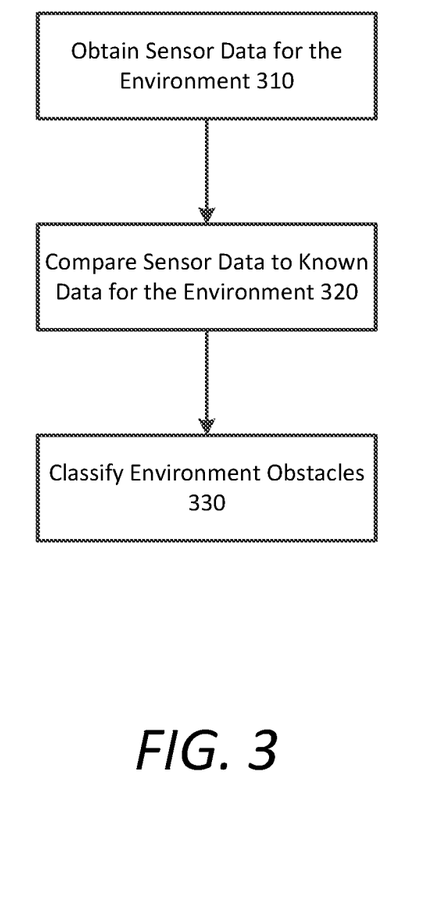
FIG. 3 is an example method of object classification.
Figure 4:
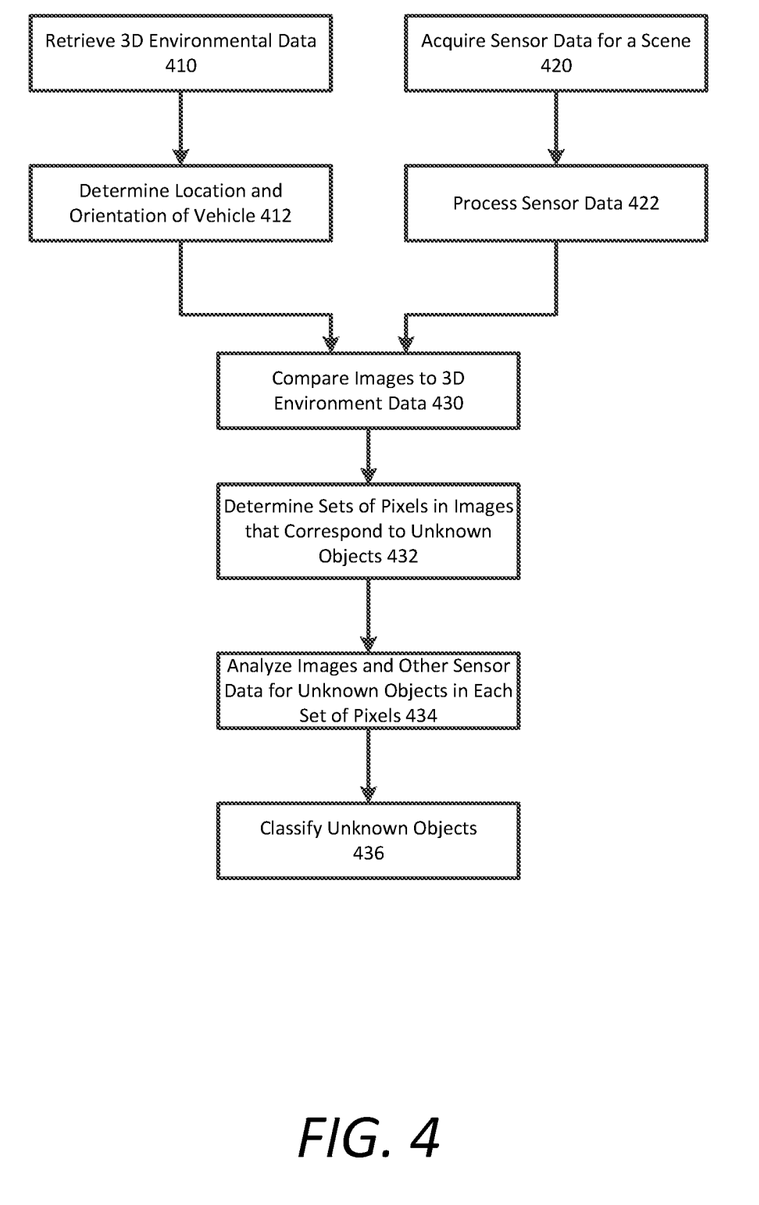
FIG. 4 is an example method of object classification using sensor data and 3D maps.

FIG. 3 illustrates an example method of object classification in accordance with one or more embodiments. FIG. 4 illustrates an example method of disparity mapping in accordance with one or more embodiments. While operations of these example implementations are described below as being performed by specific components, modules or systems of the AV 200, it will be appreciated that these operations need not necessarily be performed by the specific components identified, and could be performed by a variety of components and modules, potentially distributed over a number of machines. Accordingly, references may be made to elements of AV 200 for the purpose of illustrating suitable components or elements for performing a step or sub step being described. Alternatively, at least certain ones of the variety of components and modules described in AV 200 can be arranged within a single hardware, software, or firmware component. It will also be appreciated that some of the steps of this method may be performed in parallel or in a different order than illustrated.

Referring to FIG. 3, a vehicle can obtain sensor data for the environment through, for example, proximity or touch sensors, remote detection sensors such as provided by radar or LIDAR, a stereo camera, and/or sonar sensors as described with respect to FIGS. 1 and 2 (310). The vehicle can additionally obtain known data for the environment from previously recorded mapping resource data (i.e., sub-maps) that contain surface data for a given region. The vehicle can compare this sub-map data with the sensor data for the environment (320). The vehicle can then use the comparisons, including disparity maps and optical flow images, to create object classifications to assist the vehicle in maneuvering through road traffic to a particular destination (330). For example, a disparity mapper can utilize a current sub-map that includes recorded 3D LIDAR data and 3D stereo data of the current route traveled by the vehicle. The disparity mapper can continuously compare real-time sensor data to the data in the current sub-map to help a classifier identify potential hazards, such as pedestrians, other vehicles, bicyclists, etc.

Referring to FIG. 4, as the vehicle travels along a route, vehicle sensors can determine the location and orientation of the vehicle. The sensors can determine latitude and longitude coordinates of the vehicle and a direction of travel, which can be further refined to identify the vehicle's location in the world relative to a city, specific street, address, etc. For example, the vehicle's data processing system can retrieve sub-maps stored in a database of the vehicle or accessed remotely from the backend system via a network (410). The data processing system can use the 3D environment data stored in these sub-maps to perform localization and pose operations to determine a current location and orientation of the vehicle in relation to a given region (e.g., a city) (412).

In order to detect and classify objects in the environment around a vehicle, sensors equipped on the vehicle can continually acquire data for the environment (420). In some implementations, the data processing system can process the sensor data into one or more images or other convenient formats for analyzing and comparing the data (422). For example, a disparity mapper can process pairs of images from a stereo camera into a disparity image or map, and an optical flow unit can process consecutive images from a camera or other optical flow sensor into an image that shows motion vectors of pixels in the images over time.

Rather than analyzing the entirety of each channel of sensor data, a joint classifier can optimally focus solely on interesting or unexpected aspects discovered in the sensor data. In some implementations, the classifier can compare image maps from the processed sensor data to sub-maps of 3D environment data (430). For example, disparity data taken from stereo camera images can form a disparity map showing distances from the vehicle to objects in the environment. Assuming that no new features or objects are present in the scene that are not included in the 3D environment data, the disparity map data should be roughly equal (within a reasonable margin of error to account for map inaccuracies) to distances from the vehicle to known objects in the 3D environment data. In another example, optical flow vectors calculated between consecutive images of the scene should match the known objects (i.e., stationary objects should show no movement in a non-moving reference frame).

Any discrepancies between image maps created from the real-time sensor data and the previously recorded sub-map environment data potentially identify areas with unknown features/objects or changes since the environment data was last updated. Therefore, the classifier can determine sets of pixels in the image maps that correspond to these unknown objects in order to reduce the amount of further data processing performed on the sensor data to classify objects that may be a hazard to a vehicle (432). For each of the sets of pixels identified, the classifier can analyze images and parts of other sensor data corresponding to the identified pixels to discover objects not represented in the 3D environment data (434). For each of the discovered objects, the classifier can classify the object into a category such as other vehicles, bicyclists, or pedestrians (436). Furthermore, the classifier can identify contextual information about each object, for example, the speed and pose of the object, direction of movement, presence of other dynamic objects, and other information.

Hardware Diagram

Figure 5:
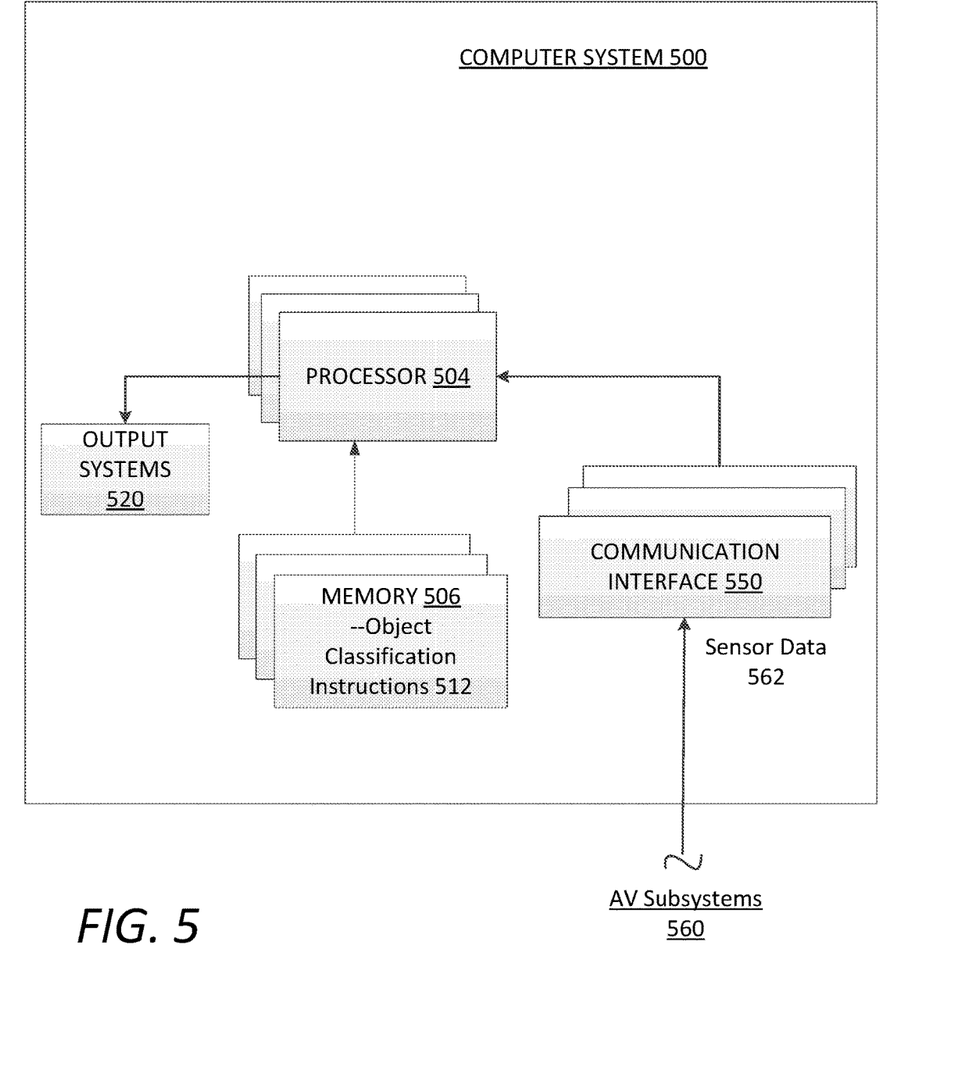
FIG. 5 is a block diagram illustrating a computer system upon which examples described herein may be implemented.

FIG. 5 is a block diagram illustrating a computer system upon which examples described herein may be implemented. For example, the data processing system 210 and classifier 235 shown and described in FIG. 2 may be implemented on the computer system 500 of FIG. 5. The computer system 500 can be implemented using one or more processors 504, and one or more memory resources 506.

According to some examples, the computer system 500 may be implemented within an autonomous vehicle with software and hardware resources such as described with examples of FIGS. 1 and 2. In an example shown, the computer system 500 can be distributed spatially into various regions of the autonomous vehicle, with various aspects integrated with other components of the autonomous vehicle itself. For example, the processors 504 and/or memory resources 506 can be provided in the trunk of the autonomous vehicle. The various processing resources 504 of the computer system 500 can also execute object classification instructions 512 using microprocessors or integrated circuits. In some examples, the object classification instructions 512 can be executed by the processing resources 504 or using field-programmable gate arrays (FPGAs).

In an example of FIG. 5, the computer system 500 can include a local communication interface 550 (or series of local links) to vehicle interfaces and other resources of the autonomous vehicle (e.g., the computer stack drives). In one implementation, the communication interface 550 provides a data bus or other local links to electro-mechanical interfaces of the vehicle, such as wireless or wired links to the AV control system 220.

The memory resources 506 can include, for example, main memory, a read-only memory (ROM), storage device, and cache resources. The main memory of memory resources 506 can include random access memory (RAM) or other dynamic storage device, for storing information and instructions which are executable by the processors 504. The processors 504 can execute instructions for processing information stored with the main memory of the memory resources 506. The main memory 506 can also store temporary variables or other intermediate information which can be used during execution of instructions by one or more of the processors 504. The memory resources 506 can also include ROM or other static storage device for storing static information and instructions for one or more of the processors 504. The memory resources 506 can also include other forms of memory devices and components, such as a magnetic disk or optical disk, for purpose of storing information and instructions for use by one or more of the processors 504.

According to some examples, the memory 506 may store a plurality of software instructions including, for example, object classification instructions 512. The object classification instructions 512 may be executed by one or more of the processors 504 in order to implement functionality such as described with respect to the disparity mapper 211, optical flow unit 212, and classifier 235 of FIG. 2.

In certain examples, the computer system 500 can receive sensor data 562 over the communication interface 550 from various AV subsystems 560 (e.g., the AV control system 220 or data processing system 210). In executing the object classification instructions 512, the processing resources 504 can monitor the sensor data 562 and generate object classifications that the AV control system 220 can use to send commands to the output systems 520 of the AV 200 in accordance with examples described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An object detection system for an autonomous vehicle (AV) comprising:
    a memory to store an instruction set; and
    one or more processors to execute instructions from the instruction set to:
        process first sensor data obtained at a first time for a road segment on which the autonomous vehicle is being driven, wherein the processed first sensor data includes two or more images at two or more different angles captured at the first time;
        compare the two or more images to create a disparity image;
        process second sensor data obtained at a second time for the road segment on which the autonomous vehicle is being driven, wherein the processed second sensor data includes one or more images at the second time;
        compare at least a first image of the two or more images at the first time and a first image of the one or more images at the second time to create a first optical flow image;
        compare the disparity image and the first optical flow image to previously recorded three-dimensional (3D) environment data for the road segment to identify one or more areas that contain differences from the previously recorded 3D environment data for the road segment in a field of view of one or more sensors for the autonomous vehicle; and
        analyze the identified one or more areas to classify objects in the field of view of the one or more sensors.

2. The object detection system of claim 1, including further instructions that the one or more processors execute to:
    identify a subset of sensor data from non-image sources corresponding to the one or more areas that contain differences from the previously recorded 3D environment data for the road segment; and
    classify the objects based on analyzing the subset of sensor data.

3. The object detection system of claim 1, including further instructions that the one or more processors execute to:
    adjust operation of the autonomous vehicle based at least on a classification of the objects.

4. The object detection system of claim 1, wherein the first optical flow image includes optical flow vectors calculated from the first image of the road segment at the first time and the second image of the road segment at the second time.

5. The object detection system of claim 1, wherein the objects are classified into classes which include pedestrians, bicycles, and other vehicles.

6. The object detection system of claim 1, including further instructions that the one or more processors execute to:
    generate a baseline disparity image using the previously recorded 3D environment data for the road segment; and
    compare the disparity image to the baseline disparity image to identify one or more areas of the disparity image that contains differences from the baseline disparity image.

7. The object detection system of claim 1, wherein the processed second sensor data includes two or more images at the second time, the system including further instructions that the one or more processors execute to:
    compare a second image of the two or more images at the first time with a second image of the two or more images at the second time to create a second optical flow image; and
    compare the first optical flow image to the second optical flow image to classify the objects in the field of view of the one or more sensors.

8. The object detection system of claim 7, including further instructions that the one or more processors execute to:
    compare the second optical flow image to the previously recorded 3D environment data for the road segment to identify the one or more areas.

9. A method for object detection, the method being implemented by one or more processors of an autonomous vehicle and comprising:
    processing first sensor data obtained at a first time for a road segment on which the autonomous vehicle is being driven, wherein the first processed sensor data includes two or more images at two or more different angles captured at the first time;
    comparing the two or more images to create a disparity image;

processing second sensor data obtained at a second time for the road segment on which the autonomous vehicle is being driven, wherein the processed second sensor data includes one or more images at the second time;

comparing at least a first image of the two or more images at the first time and a first image of the one or more images at the second time to create a first optical flow image;

comparing the disparity image and the first optical flow image to previously recorded three-dimensional (3D) environment data for the road segment to identify one or more areas that contain differences from the previously recorded 3D environment data for the road segment in a field of view of one or more sensors for the autonomous vehicle; and analyzing the identified one or more areas to classify objects in the field of view of the one or more images.

10. The method of claim 9, further comprising:
identifying a subset of sensor data from non-image sources corresponding to the one or more areas that contain differences from the previously recorded 3D environment data for the road segment; and
classifying the objects based on analyzing the subset of sensor data.

11. The method of claim 9, further comprising:
adjusting operation of the autonomous vehicle based at least on a classification of the objects.

12. The method of claim 9, wherein the first optical flow image includes optical flow vectors calculated from the first image of the road segment at the first time and the second image of the road segment at the second time.

13. The method of claim 9, wherein the objects are classified into classes which include pedestrians, bicycles, and other vehicles.

14. The method of claim 9, further comprising:
generating a baseline disparity image using the previously recorded 3D environment data for the road segment; and
comparing the disparity image to the baseline disparity image to identify one or more areas of the disparity image that contains differences from the baseline disparity image.

15. The method of claim 9, wherein the processed second sensor data includes two or more images at the second time, the method further comprising:
comparing a second image of the two or more images at the first time with a second image of the two or more images at the second time to create a second optical flow image; and
comparing the first optical flow image to the second optical flow image to classify the objects in the field of view of the one or more sensors.

16. The method of claim 15, further comprising:
comparing the second optical flow image to the previously recorded 3D environment data for the road segment to identify the one or more areas.

17. A vehicle comprising:
one or more sensors to obtain sensor data from an environment around the vehicle;
a memory to store an instruction set; and
one or more processors to execute instructions from the instruction set to:
process first sensor data obtained for a road segment at a first time on which the vehicle is being driven, wherein the processed first sensor data includes two or more images at two or more different angles captured at the first time;
compare the two or more images to create a disparity image;
process second sensor data obtained at a second time for the road segment on which the autonomous vehicle is being driven, wherein the processed second sensor data includes one or more images at the second time;
compare at least a first image of the two or more images at the first time and a first image of the one or more images at the second time to create a first optical flow image;
compare the disparity image and the first optical flow image to previously recorded three-dimensional (3D) environment data for the road segment to identify one or more areas that contain differences from the previously recorded 3D environment data for the road segment in a field of view of one or more sensors for the autonomous vehicle; and
analyze the identified one or more areas to classify objects in the field of view of the one or more sensors.

18. The vehicle of claim 17, including further instructions that the one or more processors execute to:
identify a subset of sensor data from non-image sources corresponding to the one or more areas that contain differences from the previously recorded 3D environment data for the road segment; and
classify the objects based on analyzing the subset of sensor data.

19. The vehicle of claim 17, including further instructions that the one or more processors execute to:
adjust operation of the vehicle based at least on a classification of the objects.

20. The vehicle of claim 17, wherein the first optical flow image includes optical flow vectors calculated from the first image of the road segment at the first time and the second image of the road segment at the second time.

* * * * *